United States Patent
Tremblay

(10) Patent No.: US 9,952,097 B1
(45) Date of Patent: Apr. 24, 2018

(54) INFRARED SCENE PROJECTOR AND CONVERSION CHIP THEREFORE

(71) Applicant: INSTITUT NATIONAL D'OPTIQUE, Québec (CA)

(72) Inventor: Bruno Tremblay, Lévis (CA)

(73) Assignee: INSTITUT NATIONAL D'OPTIQUE, Quebec (CA)

( * ) Notice: Subject to any disclaimer, the term of this patent is extended or adjusted under 35 U.S.C. 154(b) by 0 days.

(21) Appl. No.: 15/333,492

(22) Filed: Oct. 25, 2016

(51) Int. Cl.
| | |
|---|---|
| *G01J 3/28* | (2006.01) |
| *G21K 5/00* | (2006.01) |
| *G01J 3/10* | (2006.01) |
| *G01J 3/02* | (2006.01) |

(52) U.S. Cl.
CPC .............. *G01J 3/108* (2013.01); *G01J 3/0208* (2013.01); *G01J 3/0286* (2013.01); *G01J 3/0291* (2013.01)

(58) Field of Classification Search
CPC ........ G01J 3/108; G01J 3/0208; G01J 3/0286; G01J 3/0291
USPC .......................................... 250/493.1, 504 R
See application file for complete search history.

(56) References Cited

U.S. PATENT DOCUMENTS

| | | | |
|---|---|---|---|
| 4,299,864 A | 11/1981 | Bly | |
| 5,838,015 A | 11/1998 | Burdick et al. | |
| 7,084,405 B1 | 8/2006 | Malyutenko et al. | |
| 2003/0057372 A1* | 3/2003 | Iida | H01L 27/14649 250/338.4 |
| 2003/0113783 A1* | 6/2003 | Funaki | G01J 5/24 435/6.11 |
| 2003/0213923 A1 | 11/2003 | Kongable et al. | |
| 2004/0075464 A1* | 4/2004 | Samuelson | B82Y 10/00 326/37 |
| 2005/0218328 A1* | 10/2005 | Suzuki | G01J 5/02 250/353 |
| 2007/0242235 A1* | 10/2007 | Ohno | G03B 21/16 353/84 |
| 2013/0048884 A1* | 2/2013 | Fainchtein | H04N 5/33 250/495.1 |

(Continued)

OTHER PUBLICATIONS

Beasley et al., "Adavancements in Dynamic Scene Projection Technologies at the U.S. Army Aviation and Missile Command", Optical Sciences Corporation, 2000, pp. 1-13, United States.

(Continued)

*Primary Examiner* — Nicole Ippolito
(74) *Attorney, Agent, or Firm* — Norton Rose Fulbright Canada LLP; Alexandre Daoust

(57) ABSTRACT

The infrared scene projector has a support structure having an airtight chamber; an image projector secured to the support structure; a conversion chip having a substrate secured to the support structure, and an array of conversion units received on a face of the substrate, the array of conversion units being enclosed inside the airtight chamber and being optically coupled to the image projector, each one of the conversion units having at least one supporting post secured to the face of the substrate and a suspended platform held spaced apart from the face of the substrate by the at least one supporting post, the conversion chip being adapted to convert at least one of visible and near-infrared light received from the image projector into infrared radiation; and an infrared beam path extending away from the array of conversion units.

18 Claims, 9 Drawing Sheets

(56) References Cited

U.S. PATENT DOCUMENTS

2013/0306851 A1   11/2013   Le Noc et al.
2014/0166882 A1   6/2014    Oulachgar et al.

OTHER PUBLICATIONS

Wang et al., "One high performance technology of infrared scene projection", International Symposium on Optoelectronic Technology and Application 2014: Infrared Technology and Applications, 2014, pp. 1-6, vol. 9300, China.

Bérisset et al., "Design of a Low-Cost Cooled Dynamic Infrared Scene Generator Including a Non-Unifomity Correction Device", SPIE Conference on Technologies for Synthetic Environments : Hardware-in-the-Loop Testing IV, 1999, pp. 172-181, vol. 3697, United States.

Bryant et al., "Bolometers Running Backward: The Synergy Between Uncooled IR Sensors & Dynamic IR Scene Projectors", Proceedings vol. 6207, Infrared Imaging Systems: Design, Analysis, Modeling, and Testing XVII; 62070J (2006); doi: 10.1117/12.668130, 2006, United States.

\* cited by examiner

INFRARED SCENE PROJECTOR AND CONVERSION CHIP THEREFORE

FIELD

The improvements generally relate to the field of infrared radiation projectors which convert a light beam into thermal radiation, also referred to as infrared radiation.

BACKGROUND

Infrared scene projectors are devices intended to generate infrared synthesis images that can reveal of great usefulness in a broad variety of applications such as the debugging, testing and tuning of infrared camera devices performed in an indoor laboratory setting. Examples of infrared scene projectors can be provided. For instance, U.S. Pat. No. 5,838,015 to Burdick et al. describes an infrared projector having spaced-apart optical fibers transmitting electromagnetic radiation by total internal reflection to a like number of spaced-apart structures that are each mounted on the opposite end of one of the optical fibers. The structures absorb the transmitted radiation, convert it to heat, and emit radiation in the infrared region of the electromagnetic spectrum.

Alternately, some infrared projectors make use of Bly cells. As can be understood from U.S. Pat. No. 4,299,864 to Bly, a Bly cell typically consists of a visible light absorbing and far infrared radiation emitting membrane enclosed in an evacuated cell, wherein the membrane consists of a thin insulating film coated with an optical black made from gold alloyed with a small amount of nickel, copper or palladium. An example of infrared scene projector that makes use of an array of Bly cells is described in H.-J. Wang et al. "One high performance technology of infrared scene projection", *Proceedings of the SPIE* Vol. 9300, paper 930020, (2014).

Although existing infrared scene projectors are satisfactory to a certain degree, there remains room for improvement.

SUMMARY

In accordance with an aspect, there is provided an infrared scene projector including an array of conversion units received on a substrate. Each of the conversion units of the array can be provided in the form of a monolithic structure made up of a suitable material, each conversion unit including at least one supporting post mounted to the substrate and a suspended platform held spaced apart from the substrate by the at least one supporting post, in a manner in which thermal conduction is impeded between the suspended platform and the substrate. In this way, the suspended platform of each conversion unit of the array can emit infrared radiation independently of neighboring conversion units when it absorbs energy from an incident light beam having a wavelength in the visible and/or in the near-infrared region of the electromagnetic spectrum.

In accordance with one aspect, there is provided an infrared scene projector comprising: a support structure having an airtight chamber; an image projector secured to the support structure; a conversion chip having a substrate secured to the support structure, and an array of conversion units received on a face of the substrate, the array of conversion units being located inside the airtight chamber and being optically coupled to the image projector, each one of the conversion units having at least one supporting post secured to the face of the substrate and a suspended platform held spaced apart from the face of the substrate by the at least one supporting post, the conversion chip being adapted to convert at least one of visible and near-infrared light received from the image projector into infrared radiation and an infrared beam path extending away from the array of conversion units.

In accordance with another aspect, there is provided a conversion chip comprising: a substrate and an array of conversion units received on a face of the substrate, each one of the conversion units having at least one supporting post secured directly to the face of the substrate, and a suspended platform held spaced apart from the face of the substrate by the at least one supporting post, each conversion unit being adapted to convert at least one of visible and near-infrared light into infrared radiation.

In this disclosure, the term "conversion" is used to refer to the physical phenomenon by which a body can absorb a fraction of the energy carried by a light beam having, for instance, a wavelength lying in the visible region or near-infrared region of the electromagnetic spectrum, the absorption causing an increase of the body's temperature, and the absorbed energy then being radiated in the form of infrared radiation (heat). As will be understood, the energy of the absorbed light is "converted" into infrared radiation. Accordingly, the conversion units produce a spectral shift of a center wavelength of the radiation, i.e. the center wavelength of the emitted radiation is of a longer wavelength than the center wavelength of the received radiation.

In the context of this specification, including its claims, the term "secured" is defined in a broad manner and is intended to encompass the variants of "directly secured" and "indirectly secured" (e.g., via an additional component). For instance, the substrate may be secured to the support structure while actually being mounted within an airtight chamber which is, in turn, secured to the support structure.

Many further features and combinations thereof concerning the present improvements will appear to those skilled in the art following a reading of the instant disclosure.

DESCRIPTION OF THE FIGURES

In the figures.

DETAILED DESCRIPTION

Figure 1:
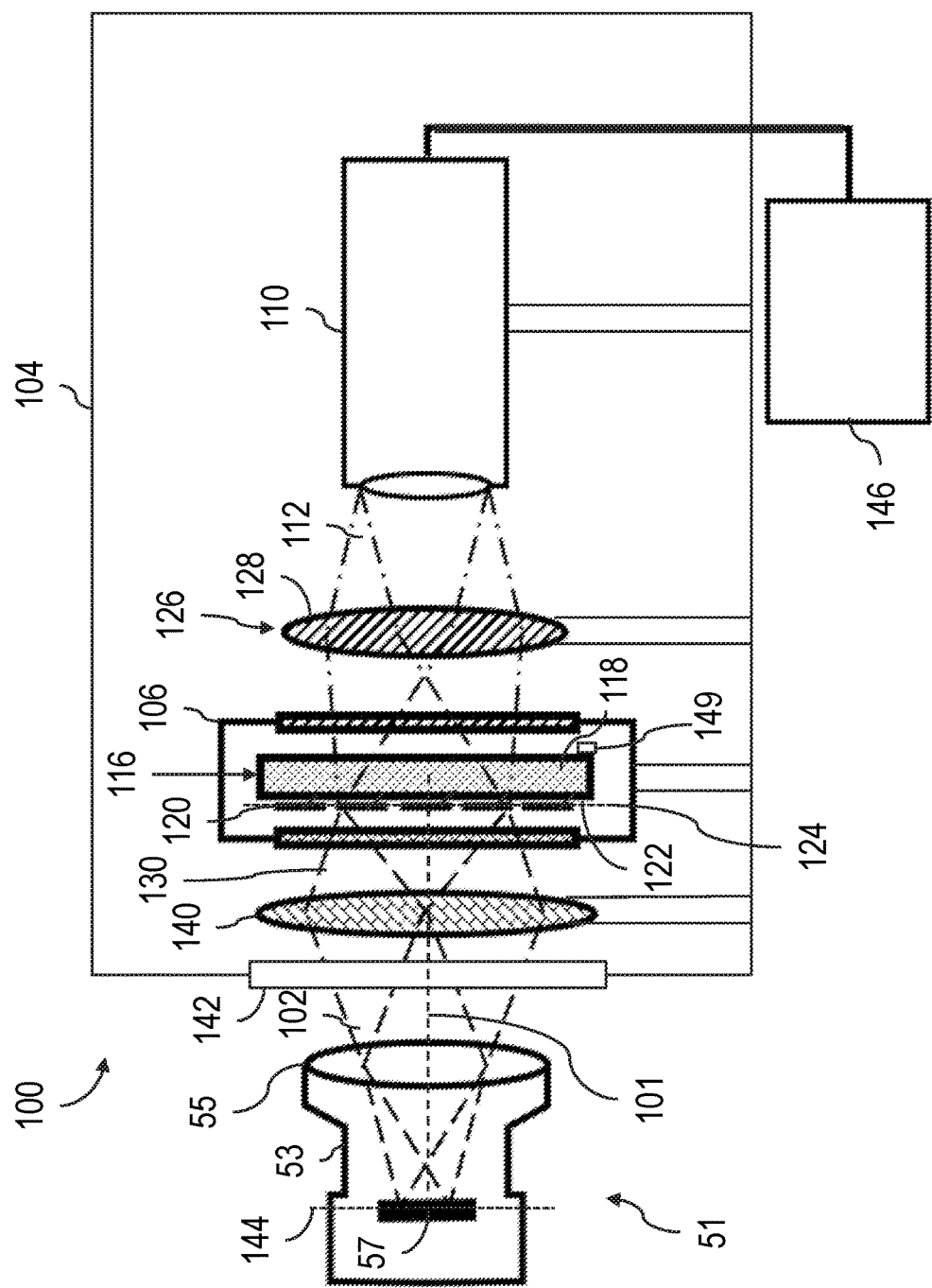
FIG. 1 is a schematic view of an example of an infrared scene projector including a conversion chip operable in a backlighted configuration, in accordance with an embodiment.

FIG. 1 shows an example of an infrared scene projector 100, in accordance with an embodiment. The infrared scene projector 100 can be used to project a pixelated image in the form of an infrared beam 102 along an infrared beam path 101, including radiation in the infrared region of the electromagnetic spectrum.

Broadly described, the infrared scene projector 100 has a housing 104 forming a support structure receiving both an image projector 110 and an airtight chamber 106. The image projector 110 is configured to project a light beam 112 along a light beam path. The light beam 112 carries image information and its wavelength lies in the visible and/or near-infrared region of the electromagnetic spectrum. As will be described herebelow, a computer 146 can be used to forward image data to the image projector 110. The image can be projected as a still image or it can be projected in rapid sequence (e.g., a video stream).

As can be understood, the image projector 110 can be a typical commercially-available image projector. It can have a high-definition (HD) resolution of 1280 pixels per 720 pixels, a full HD resolution of 1920 pixels per 1080 pixels, a 4K ultra-HD (UHD) resolution of 3840 pixels per 2160 pixels, a 8K UHD resolution of 7680 pixels per 4320 pixels, a 16K UHD resolution of 15360 pixels per 8640 pixels, or any other suitable resolution. In some embodiments, the frame rate of the image projector 110 can range from 30 frame-per-second (fps) to 140 fps. However, the image projector 110 can have any suitable frame rate adapted to the needs of the intended application. In some specific embodiments, the image projector 110 is adapted to project the light beam 112 with a power of 2000-4000 Lumens or, equivalently, 2.5 W to 5 W. In alternate embodiments, the power can be greater. As will be understood, any satisfactory image projector 110 can be used. For instance, in alternate embodiments, the image projector 110 can include a laser scanning system which can controllably direct a laser beam onto the array of conversion units.

As shown in FIG. 1, the infrared scene projector 100 has a conversion chip 116 having a substrate 118 secured to the housing 104, and an array of conversion units 120 received by a face 122 of the substrate 118. In this embodiment, the substrate 118 is planar. However, the substrate 118 can have any other suitable shape. As depicted, the array of conversion units 120 is located inside an airtight chamber 106 and is optically coupled to the image projector 110. Indeed, the light beam 112 extends from the image projector 110 to the conversion chip 116.

As can be seen in this example, the conversion units 120 are optically coupled to the image projector 110 by using focusing optics 126. As shown, the focusing optics 126 is secured to the housing 104 and adapted to receive the light beam 112 emitted from the image projector 110 to form an image brought into sharp focus on the array of conversion units 120.

In some embodiments, the focusing optics 126 is provided in the form of a single lens 128. However, it is understood that the focusing optics 126 can include more than one lens, and that the focusing optics 126 can be included as part of an off-the-shelf image projector. In alternate embodiments, the focusing optics 126 includes one or more reflective elements. Other suitable embodiments of the focusing optics can be used. For instance, the focusing optics 126 may include a type of zoom feature for easy setting of the size of the image formed on the array of conversion units 120.

As will be understood, during use, each of the conversion units 120 of the array can receive a corresponding portion of the image generated by the image projector 110. Each of conversion units 120 can then absorb a fraction of the energy from the portion of the light beam 112 incident on it, thereby rising in temperature, and radiate infrared radiation 130 along the infrared beam path 101 extending from the array of conversion units 120. The infrared beam path 101 extends outside the housing 104. The infrared radiation 130 can have an emission spectrum approaching that of a blackbody at a given temperature. The infrared radiation 130 radiated by each one of the conversion units can then be collected and projected in a manner to form, in a specific plane, an infrared image which can have a resolution comparable to that of the image projected by the image projector 110.

In some embodiments, the quantity of conversion units 120 in the array is chosen such that any given pixel of the image projector 110 illuminates a plurality of conversion units 120 of the array in order to maintain the original resolution of the image while avoiding aliasing effects. Accordingly, the quantity of conversion units 120 in the array can be equal to a given integer multiple of the quantity of pixels of the image projector 110. For instance, in an embodiment wherein the image projector 110 has a HD resolution of 1280 pixels per 720 pixels, the array can have more than 4 million conversion units. Adjacent conversion units 120 are separated from one another in order to provide thermal insulation.

As depicted in FIG. 1, the infrared scene projector 100 may also include projecting optics 140. The projecting optics 140 is secured to the housing 104 and optically coupled to the array of conversion units 120. More precisely, the projecting optics 140 is configured to collect a part of the infrared radiation 130 emitted from the conversion units 120 and to form an infrared image brought into focus in a given plane in a scene. As can be seen in this embodiment, the given plane of the scene generally corresponds to the plane of the infrared image sensor 57 of an infrared camera 51 under test and placed in front of the projecting optics 140. The image formed in the plane of the infrared image sensor 57 is a properly-sized replica of the infrared image formed on the array of conversion units 120. A protective window 142 can be set in front of the projecting optics 140, and the protective window 142 can also be part of the projecting optics 140. The projecting optics 140 can include one or more than one lens in some other embodiments. In alternate embodiments, the projecting optics 140 includes one or more reflective elements. Other suitable embodiments of the projecting optics can be used. The projecting optics 140 can have a zoom feature for ease of adjusting the size of the image formed on the infrared image sensor 57 of the infrared camera. It will be understood that the use of projecting optics is optional. Indeed, the objectives of some infrared cameras can be adjusted to provide images of the conversion units 120 in focus, without the need for additional optical elements. In applications where the infrared scene projector 100 is used for testing an infrared camera 51 having its objective 55 focused to infinity, the projecting optics can be configured to act as an optical collimator.

In some embodiments, the airtight chamber 106 is maintained at the atmospheric pressure whereas, in some other embodiments, the airtight chamber 106 includes a vacuum. The vacuum can be made using a pump (e.g., a dry pump). As can be understood, a pressure control mechanism can be used to vary the pressure inside the airtight chamber 106. For instance, the pressure inside the airtight chamber 106 can be variable or permanent. The airtight chamber 106 can be made of aluminium, stainless steel or any other suitable material adapted to maintain and support a given pressure, and thus the vacuum, over time. Most commonly available image projectors do not sustain vacuum and would thus, along with any other component of this type, be housed outside the airtight chamber.

Figure 2:
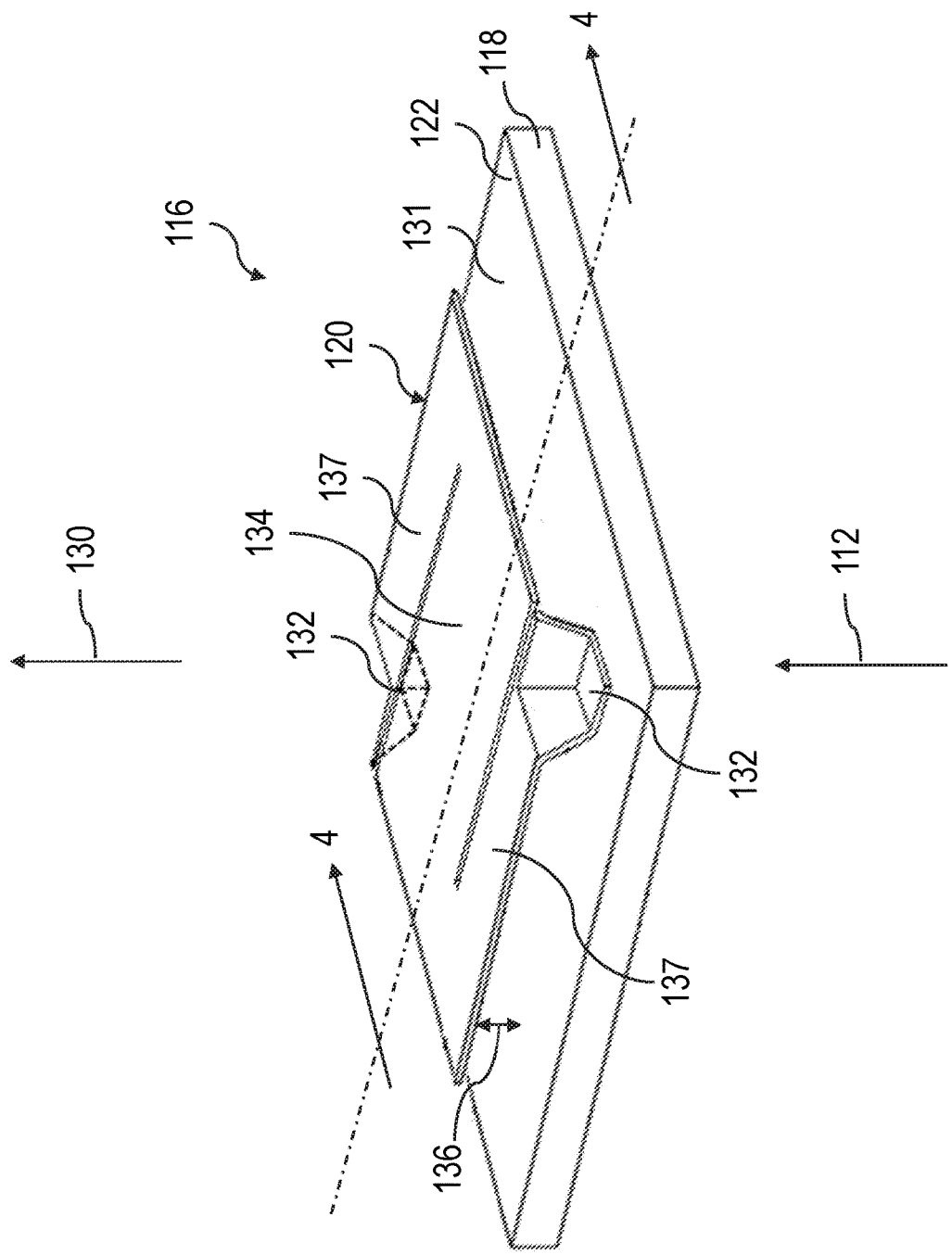
FIG. 2 is an oblique view of a single conversion unit shown secured to a portion of a substrate of the conversion chip of FIG. 1.

FIG. 2 shows an oblique and partial view of the conversion chip 116, in accordance with an embodiment. More specifically, there is shown a single one of the conversion units 120 as received on a corresponding area 131 of the substrate 118. As depicted, the conversion unit 120 has two supporting posts 132 mounted on the substrate 118, and a suspended platform 134 held spaced apart by a spacing 136 from the substrate 118 via the supporting posts 132. In this specific example, the two supporting posts 132 are located at opposite corners of the conversion unit 120 to provide suitable support. One or more than two supporting posts can also be used in alternate embodiments.

As also shown in FIG. 2, a support arm 137 is provided to connect the suspended platform 134 to a corresponding one of the two supporting posts 132. It is intended that the length of the support arm 137 can help further thermally insulate the suspended platform 134 from the substrate 118.

It is noted that any given conversion unit 120 can absorb optical energy and then heat up according to: i) the optical power carried by the portion of the light beam 112 incident on the given conversion unit 120, ii) the surface of the conversion unit 120, iii) the optical absorption q of the conversion unit 120 in the visible and/or in the near-infrared, and iv) the thermal insulation provided by the supporting posts 132 and the support arm 137 relative to the substrate 118. As shown in this embodiment, each conversion unit 120 consists of a monolithic, continuous structure made up of a given material, and including the suspended platform 134, the supporting posts 132 and optional support arms 137.

As can be understood, once the conversion unit 120 is heated to a given temperature by the portion of the light beam 112 incident on it and that the conversion unit 120 radiates infrared radiation 130 according to the absorbed optical power, the given conversion unit 120 can then gradually cool via heat transfer to the substrate 118 via the support arms 137 and supporting posts 132. The cooling can be characterized by a time constant $\tau$ which mainly depends on both the heat capacity C of the conversion unit 120 and on the thermal conductance G of the supporting posts 132 and optional arms 137. The time constant $\tau$ can vary from less than 1 ms to above 30 ms, depending on the shape, heat capacity C, and thermal conductance G of a given conversion unit 120. Vacuum pressure can also affect the time constant. Based on the factors i), ii), iii) and iv) recited above, the temperature of a given conversion unit 120 may rise from a fraction of K to more than 100 K.

Varying the pressure inside the airtight chamber 106, e.g., from lower than $10^{-3}$ Torr to about 760 Torr (~1 ATM), can allow, for a given configuration of the conversion unit 120, to increase the thermal conductance G of the conversion unit 120 which can indirectly allow to decrease the time constant $\tau$ and the maximal temperature rise. Therefore, varying the pressure inside the airtight chamber 106 can enable some control of the response time and the sensitivity of the conversion unit 120 to the incoming light beam 112 without modifying the configuration of the array of conversion units 120.

Each conversion unit 120 can be made from Silicon Nitride ($Si_3N_4$), Silicon Dioxide ($SiO_2$) or any other material having suitable thermal and mechanical properties. The conversion unit 120 can have a square shape having sides ranging from less than 5 μm to even more than 35 μm. The size of the conversion unit 120 depends on a desired spatial resolution. The suspended platform 134 can have a thickness ranging from 250 Å to 1000 Å or even more. Two adjacent conversion units 120 may be spaced by 0.5 μm to 2 μm. The supporting posts 132 of a conversion unit 120 can have a square shape, a rectangular shape, or any other suitable shape, and can have a width and/or a length varying from 3 μm to 5 μm. In this embodiment, the height of the supporting posts 132 corresponds to the spacing 136.

Each support arm 137 can have, for instance, a thickness ranging from 250 Å to 1000 Å, a width ranging from 500 nm to 2000 nm, and a length ranging from 0 to 50 μm. In the illustrated embodiment, each support arm 137 has a rectilinear shape. However, in some other embodiments, the support arm 137 can have an elbow shape, a zig-zag shape, a spiral shape, or any other suitable shape. The support arms 137 are sized and shaped so as to provide desirable thermal insulation of the suspended platform 134. Although two support arms are shown in this embodiment, a single support arm, or more than two support arms can be provided in other embodiments.

Figure 3:
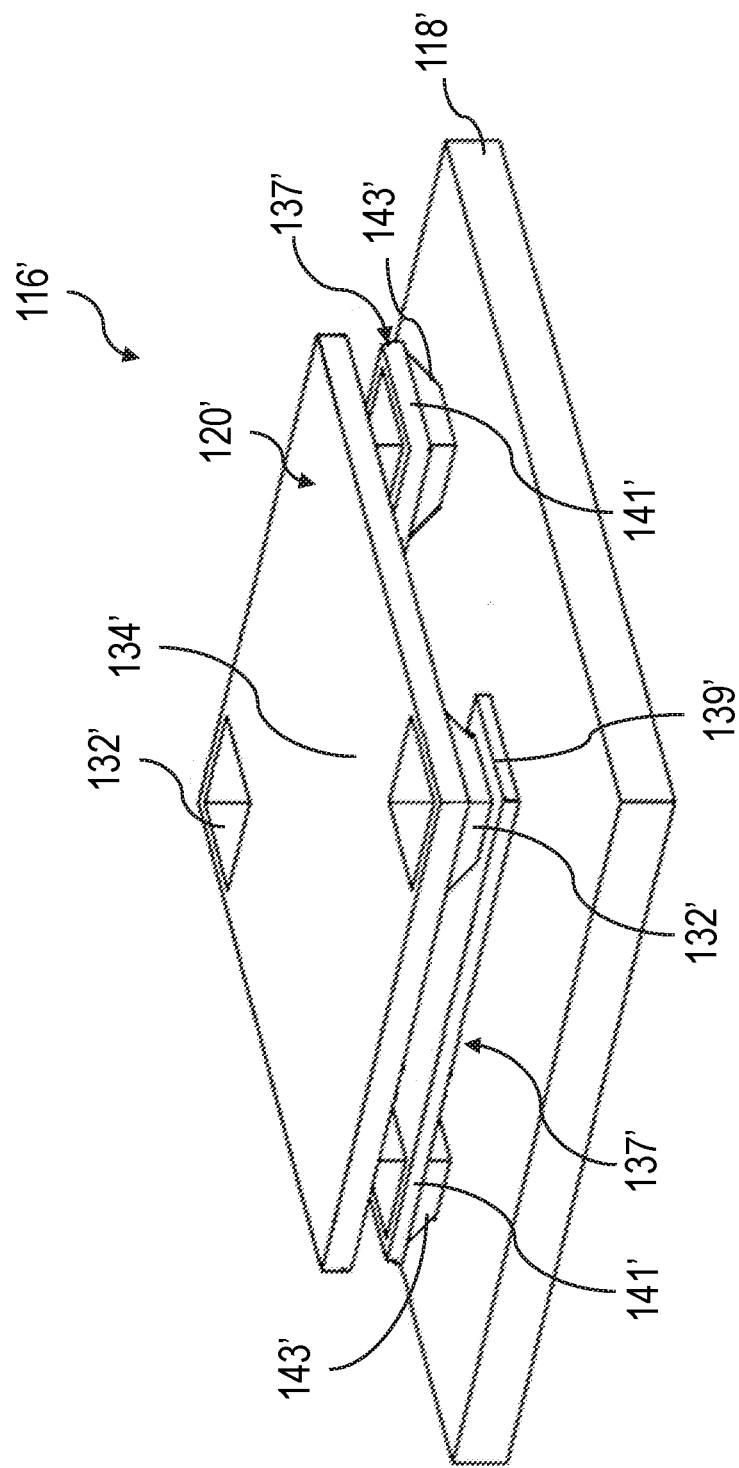
FIG. 3 is a partial and oblique view of an example of a conversion chip having support arms provided between a substrate and a suspended platform of the conversion chip, in accordance with an embodiment.

In alternate embodiments, such as shown in the conversion chip 116' illustrated in FIG. 3, the suspended platform 134' of the conversion unit 120' is connected to the substrate 118' via two support arms 137' lying in the spacing between the suspended platform 134' and the substrate 118'. More specifically, each of the two support arms 137' has a first end 139' adapted to receive a corresponding one of the two supporting posts 132' and a second end 141' having a second supporting post 143' connecting the support arm 137' to the substrate 118'. As it can be seen, each support arm 137' provides an intermediate height level between the suspended platform 134' and the substrate 118'. Each second supporting post 143' can be similar to the supporting post 132'. Understandably, the quantity of support arms 137' is not limited to two. In some embodiments, only one support arm 137' is provided whereas more than two support arms 137' are provided in some other embodiments.

The substrate 118 can be made of a material which allows fabrication of the conversion units 120 atop thereof. The substrate 118 can have any suitable dimensions. For instance, in the case wherein the substrate 118 has a circular shape, the substrate 118 can have a diameter ranging from below 25 mm to up to 300 mm, and have a thickness from below 0.5 mm to up to 10 mm.

When the substrate 118 is used in a backlighted (backlit) configuration, such as the one shown in FIG. 1, the substrate 118 can be chosen so as to be optically transparent to visible and/or near-infrared light. For instance, it can be made of glass, quartz, silicon, or any other suitable material.

Figure 4:
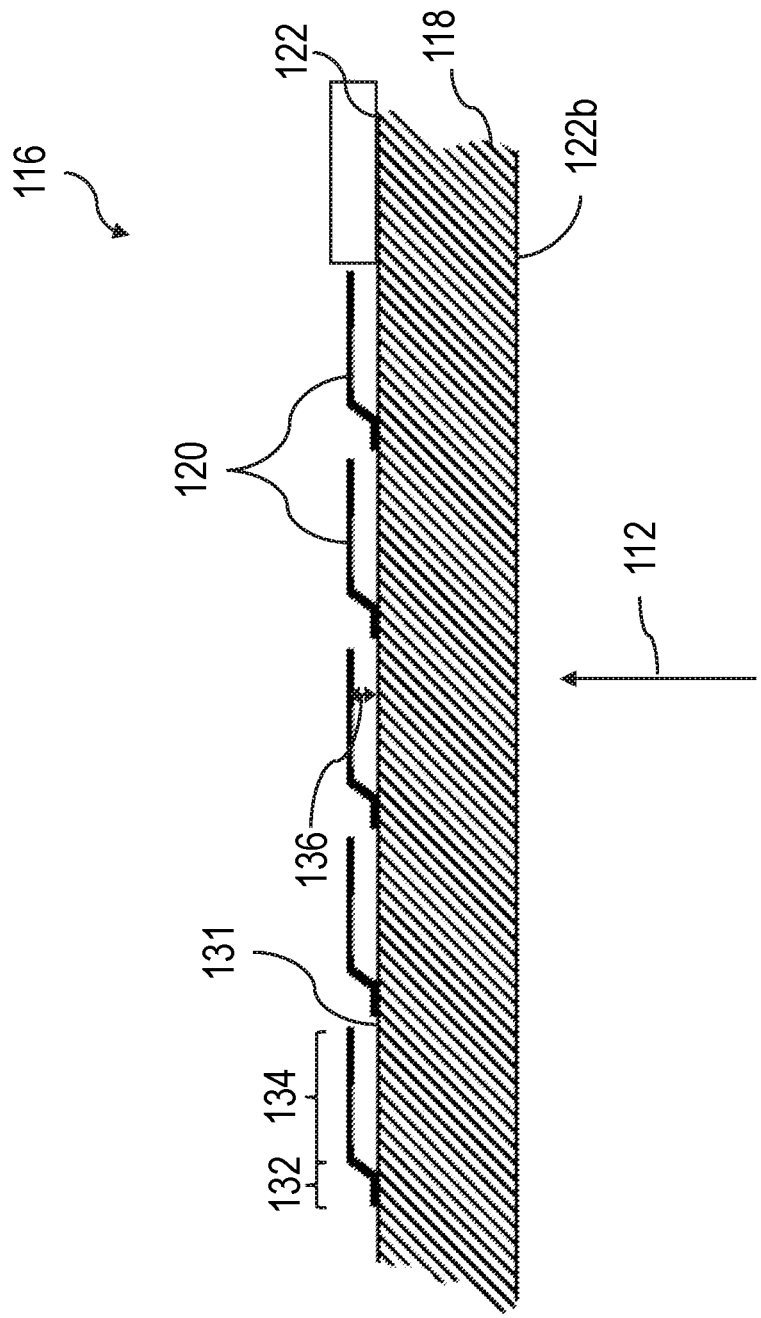
FIG. 4 is a sectional and side view of the conversion chip of FIG. 2 taken along line 4-4 of FIG. 2, in accordance with an embodiment.

FIG. 4 shows a sectional view of a row or column of the array of conversion units 120, as taken along line 4-4 of FIG. 2, in accordance with an embodiment. The spacing 136 between the suspended platform 134 of each of the conversion units 120 and the substrate 118 can be selected in the range from 1 μm to above 5 μm, and it remains the same for all the conversion units 120 of the array. The substrate 118 can also have an antireflection coating to prevent undue optical power losses of the light beam 112 when reflecting upon the other face 122b of the substrate 118.

In some embodiments, the supporting posts 132 of each conversion unit 120 are in direct contact with the face 122 of the substrate 118. Such a direct contact may simplify the manufacture of the conversion chip 116. For instance, the supporting posts 132 can be formed by applying material directly onto the material forming the face 122 of the substrate 118, without any additional layer therebetween. Alternately, a buffer layer could be deposited on the face 122 of the substrate 118 to provide better adhesion of the supporting posts 132 to the substrate 118, or a thin film which is reflective to infrared radiation but transparent to visible and near-infrared light could be deposited to improve the infrared emission of each conversion unit 120 in the direction of the projecting optics 140 (see FIG. 1).

As depicted, the infrared scene projector 100 is shown in one example application. In this application, as seen on FIG. 1, the infrared scene projector 100 is used to form infrared images on the infrared image sensor 57 of an infrared camera 51 for testing and characterization purposes. In this specific embodiment, the infrared camera 51 has a camera housing 53, an infrared image sensor 57 mounted to the camera housing 53, and an objective 55 mated to the camera housing 53. As will be understood, the infrared scene projector 100 can be used in other applications in which infrared images representing desired scenes are required.

As will be understood, the conversion chip of FIG. 1 is for use in a transmission configuration or a backlit configuration. For ease of understanding, reference is now made to FIG. 5. As depicted in this example, the light beam 112 is projected towards the left. In this embodiment, the airtight chamber 106 has a first transmission window 147. The first transmission window 147 is, in this embodiment, adapted to be optically transparent to the light beam 112 so that most of the optical power carried by the light beam 112 reaches the substrate 118. For instance, the first transmission window 147 can be made of BK7, quartz or any other suitable material. As will be understood, the first transmission window 147 can have any suitable shape (e.g., circular) or dimensions which can avoid obstruction of the light beam 112. The first transmission window 147 can be installed to the airtight chamber 106 using a sealing element such as an O-ring made of synthetic rubber, for instance. The first transmission window 147 can have an antireflection coating on either or both faces.

As mentioned above, in such a backlit configuration, the substrate 118 is made of a material which is optically transparent to the light beam 112. In this way, the light beam 112 is transmitted through the substrate 118 before reaching the conversion units 120. In an alternate embodiment, the conversion unit can be used in a front lit configuration with the visible and/or near-infrared image projected directly onto the conversion units, and the conversion units can radiate infrared radiation across the substrate 118. Accordingly, the substrate can be selected to be suitably transparent to infrared radiation.

As described above, as the conversion units 120 heat upon absorption of the light beam 112, the conversion units 120 radiate infrared radiation 130 in all directions. In this embodiment, a second transmission window 148 is provided to the airtight chamber 106. The second transmission window 148 is optically transparent to the infrared radiation 130 (including midwave infrared (MWIR) and/or long-wave infrared (LWIR)) such that the major part of the infrared radiation 130 can reach the projecting optics 140 (see FIG. 1). The second transmission window 148 can be made, for instance, of Germanium (Ge), Zinc Selenide (ZnSe) or any other suitable material. It is noted that the second transmission window 148 can have any suitable shape (e.g., circular) or dimensions which can avoid obstruction of the portion of the infrared radiation 130 which is directed towards the projecting optics 140. The second transmission window 148 can be installed to the airtight chamber 106 using a sealing element such as an O-ring made of synthetic rubber, for instance. The second transmission window 148 can have an antireflection coating on either or both faces.

Figure 5:
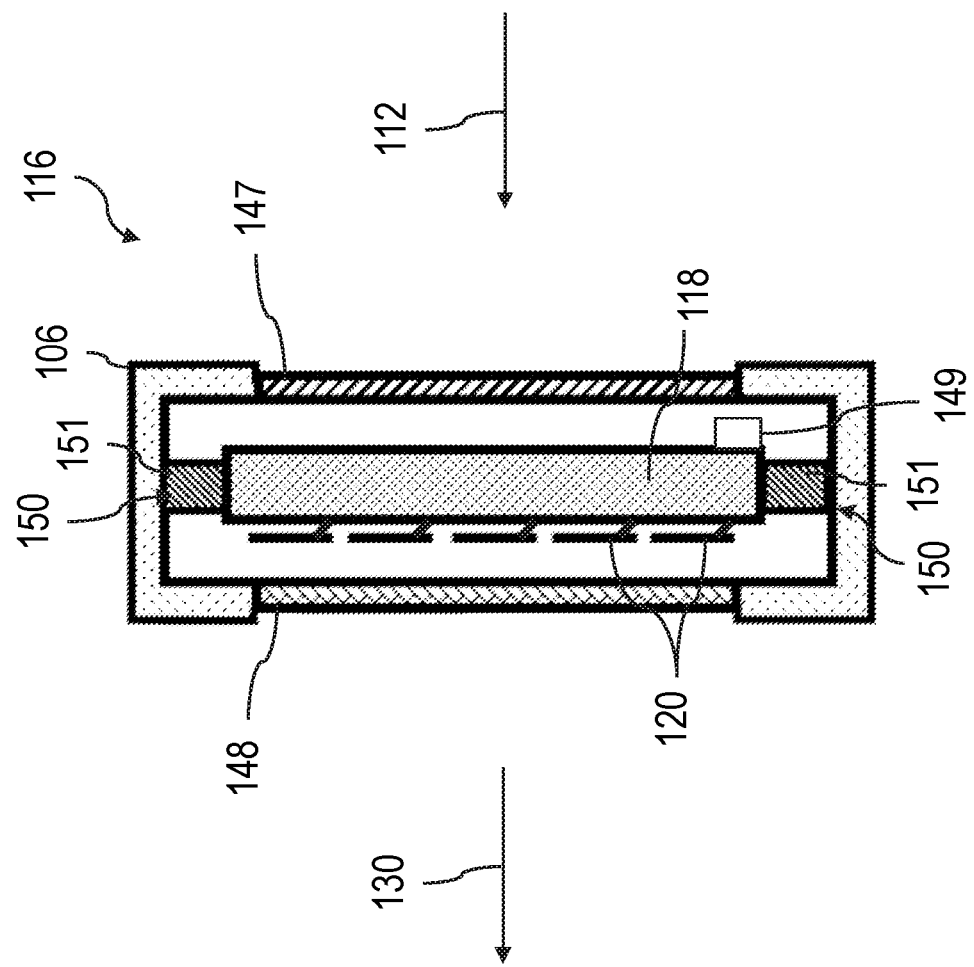
FIG. 5 is a schematic view of an example of the conversion chip of FIG. 1, in accordance with an embodiment.

In some embodiments, such as the one shown in FIG. 5, the substrate 118 is secured to the airtight chamber 106 via at least one support. In this specific embodiment, two supports 150 are used. In some other embodiments, the substrate 118 can be secured directly to the airtight chamber 106.

In some embodiments, the airtight chamber 106 is adapted, sized and shaped so as to form a heat sink which can drain heat away from the substrate 118 via the two supports 150.

In some of these embodiments, each of the two supports 150 includes a heat transfer device 151 which can be operated to remove or add heat from or to the substrate 118 and to transfer the removed or added heat, for instance, towards or from the airtight chamber 106 or the housing 104, depending on the embodiments. Examples of a heat transfer device include a thermo-electric cooler, a hydraulic cooler having a cooling fluid (e.g., water, Freon, liquid nitrogen) flowing through conduits inside or near the two supports 150. In these embodiments, the heat transfer device can be used to vary and control the temperature of the corresponding support 150 and of the substrate 118 from 77 K to 325 K. A temperature sensor 149 can be used to monitor and/or control the temperature of the substrate 118.

Figure 6:
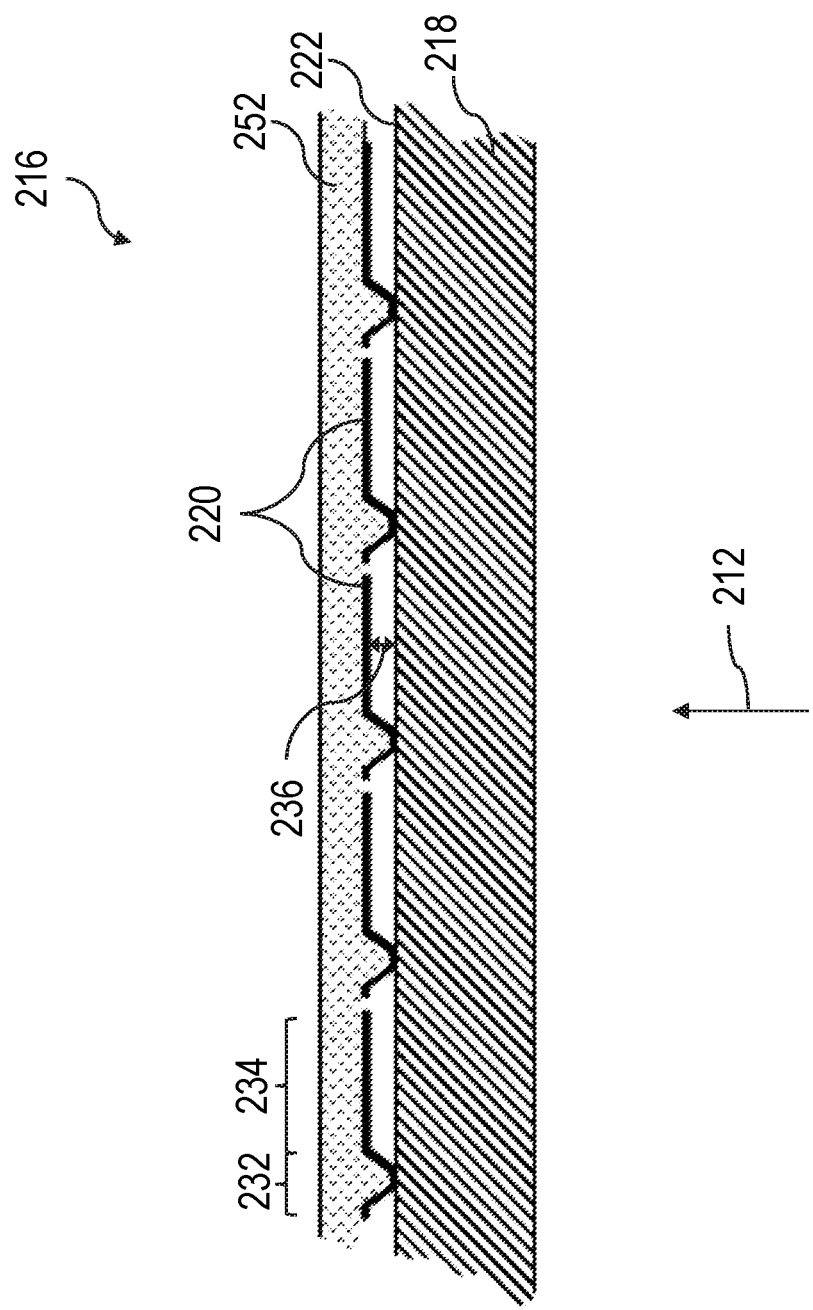
FIG. 6 is a sectional and side view of an example of a conversion chip including an absorber layer, in accordance with an embodiment.

FIG. 6 shows a sectional and partial view of another example of a conversion chip 216, in accordance with another embodiment. Similar elements will bear similar reference numerals, but in the 200 series, for ease of reading.

As shown, the conversion chip 216 has a substrate 218 and an array of conversion units 220 received by a face 222 of the substrate 218. In this embodiment, each one of the conversion units 220 has one supporting post 232 mounted to the face 222 of the substrate 218, and a suspended platform 234 held spaced apart by a spacing 236 from the face 222 of the substrate 218 via the supporting post 232. As shown in this embodiment, the supporting post 232 of each of the conversion units 220 is in direct contact with the substrate 218.

In this specific embodiment, an absorber layer 252 covers the array of conversion units 220 to increase the amount of energy of the light beam 212 that is absorbed by the conversion chip 216 and converted into infrared radiation. In this embodiment, the absorber layer 252 is chosen so as to provide adequate absorption of visible and/or near-infrared light while being highly emissive in the infrared (including midwave infrared and long-wave infrared). The absorber layer 252 can include "Gold Black" or other materials offering similar optical absorption properties. The absorber layer 252 has a thickness varying from 10 Å to 50 µm. In alternate embodiments, the absorber layer 252 can be trimmed in-between adjacent conversion units 220 to increase the spatial resolution when the absorber layer 252 is relatively thick. Accordingly, the absorber layer 252 can be trimmed into a plurality of distinct absorber layer portions, wherein each of the plurality of absorber layer portions being on top of a corresponding one of the conversion units of the array. Such trimming can be performed via laser trimming, for instance.

In alternate embodiments, the suspended platform of each conversion unit can be provided with frequency selective surfaces (FSSs) specifically designed so as to absorb optical frequencies of the light beam 212 lying in the visible and near-infrared. An example of a FSS can include holes of different sizes or other frequency selective features machined or patterned directly on the suspended platform 234. Likewise, the holes or features can be machined on either a dielectric layer or a metallic layer previously deposited on the suspended platform 234.

As described in the following paragraphs, in some other embodiments, the conversion chip 216 is used in a front lighted (front lit) configuration. In these embodiments, the light beam 212 is received from above, and not from below such as shown in FIG. 6. Accordingly, in these embodiments, the substrate 218 needs not to be optically transparent to the visible and/or near-infrared.

Figure 7:
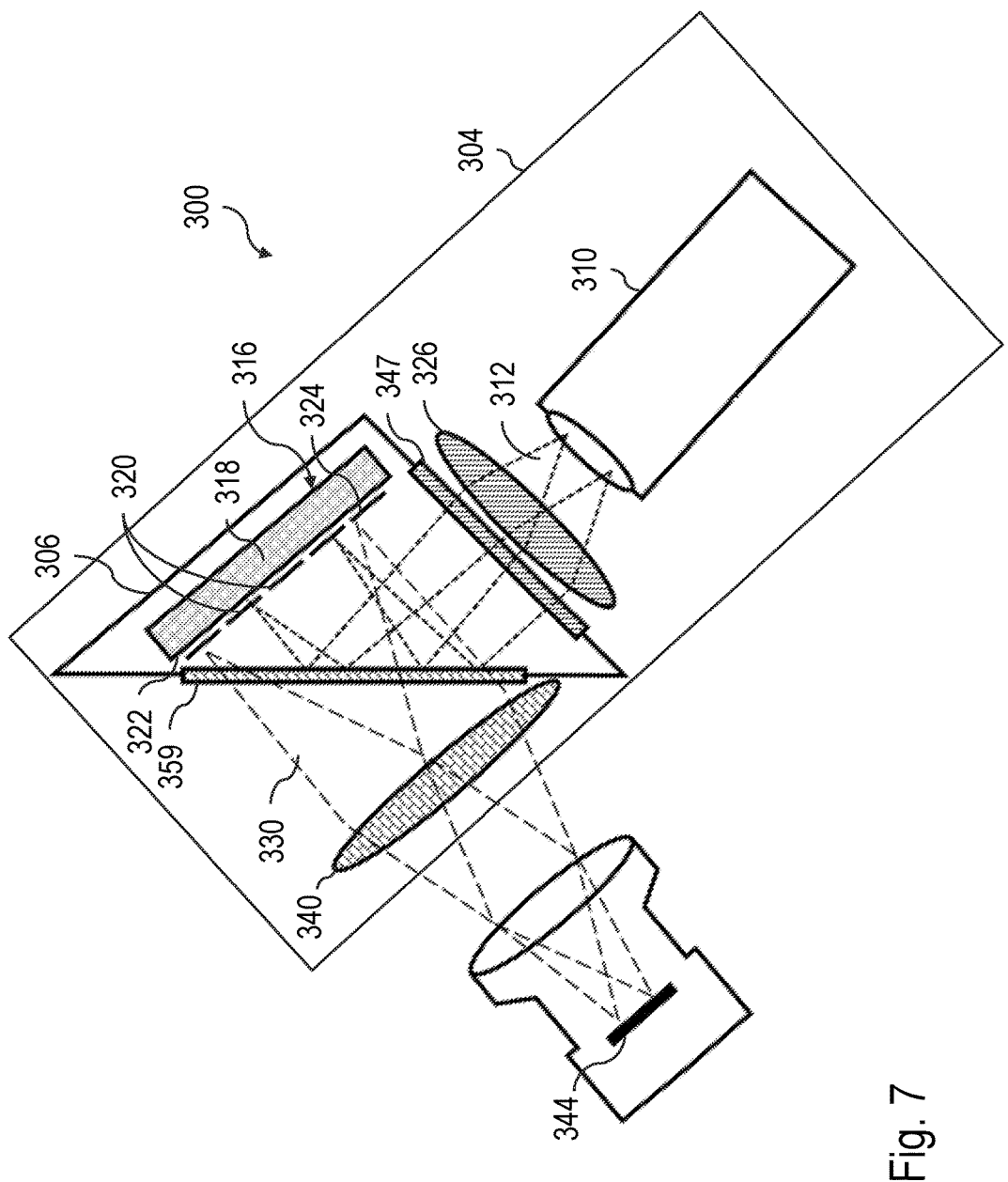
FIG. 7 is a schematic view of an example of an infrared scene projector including a conversion chip operable in a front lighted configuration, in accordance with an embodiment.

FIG. 7 shows another example of an infrared scene projector 300, in accordance with an embodiment. Similar elements will bear similar reference numerals, but in the 300 series, for ease of reading.

As depicted, the infrared scene projector 300 has a housing 304, an image projector 310 secured to the housing 304, and a conversion chip 316 located in an airtight chamber 306, the conversion chip having a substrate 318 with a face 322 receiving an array of conversion units 320. As can be seen, focusing optics 326 is provided to receive a light beam 312 emitted from the image projector 310 and to form an image on the array of conversion units 320. Projecting optics 340 is provided and optically coupled to the array of conversion units 320. The projecting optics 340 collects infrared radiation 330 radiated by the conversion units 320, and form an image on the image sensor 344 of an infrared camera.

In contrast with the embodiment shown in FIG. 1, the conversion chip 316 is used in a front lit configuration instead of being used in a backlit configuration. Accordingly, the airtight chamber 306 has a first transmission window 347 which is optically transparent to visible and near-infrared light so that the light beam 312 can enter into the airtight chamber 306. For instance, the first transmission window 347 can be made of BK7, quartz or of any other suitable optical material. As will be understood, the first transmission window 347 can have any suitable material shape (e.g., circular) or dimensions which can avoid obstruction of the light beam 312. The first transmission window 347 can be installed to the airtight chamber 306 using a sealing element such as an O-ring made of synthetic rubber, for instance. The first transmission window 347 can have an antireflection coating on either or both faces.

As shown, the airtight chamber 306 also has a dichroic optical element 359 which is used to reflect the light beam 312 towards the array of conversion units 320. To do so, the dichroic optical element 359 is adapted to be optically reflective (e.g., using a reflective coating) to visible and/or near-infrared light.

In this specific embodiment, the dichroic optical element 359 is also adapted to be optically transparent in the infrared (including midwave infrared and/or long-wave infrared). For instance, the dichroic optical element 359 can be made of Germanium (Ge), Zinc Selenide (ZnSe) or of any other suitable material. In this way, the dichroic optical element 359 can transmit at least a portion of the infrared radiation 330 emitted from the array of conversion units 320 to the dichroic optical element 359 so as to reach the projecting optics 340. As will be understood, the dichroic optical element 359 can have any suitable material shape (e.g., circular) or dimensions which can avoid obstruction of the light beam 312 or the infrared radiation 330 in either ways. The dichroic optical element 359 can be installed to the airtight chamber 306 using a sealing element such as an O-ring made of synthetic rubber, for instance.

As shown in this embodiment, the first transmission window 347 is set perpendicular to the array of conversion units 320, and the dichroic optical element 359 forms an angle of 45° with both the first transmission window 347 and the array of conversion units 320. In alternate embodiments, a different angle can be used.

Figure 8:
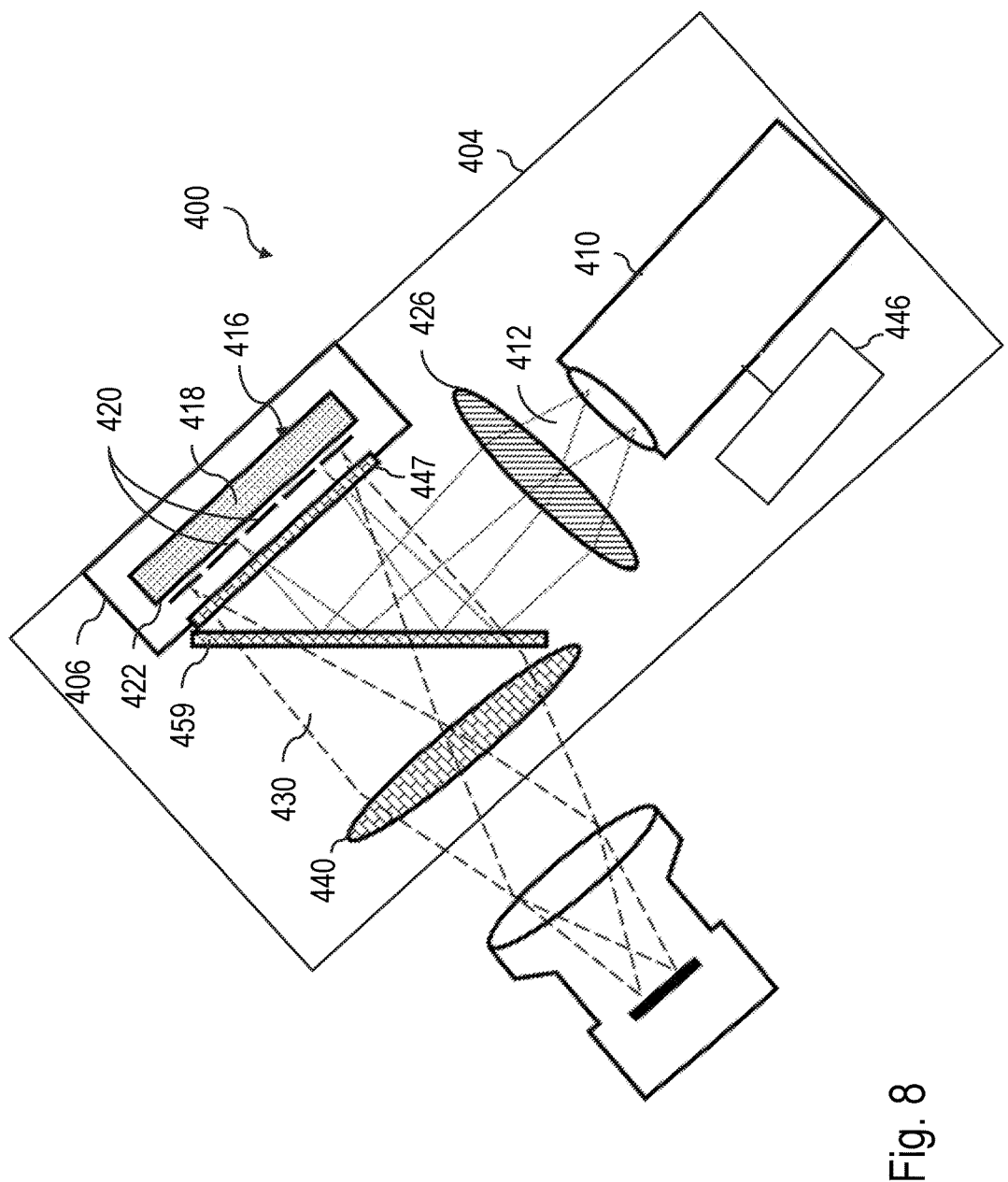
FIG. 8 is a schematic view of an example of an infrared scene projector including another example of a conversion chip operable in a front lighted configuration, in accordance with an embodiment.

As will be understood, the dichroic optical element 359 needs not to be part of the airtight chamber 306. FIG. 8 shows another example of an infrared scene projector 400 in accordance with an embodiment. Similar elements will bear similar reference numerals, but in the 400 series, for ease of reading.

As depicted, the infrared scene projector 400 has a housing 404 having an airtight chamber 406, an image projector 410 secured to the housing 404, a conversion chip 416 having a substrate 418 secured to the housing 404 and an array of conversion units 420 received by a face 422 of the substrate 418. As can be seen, focusing optics 426 is provided to focus a light beam 412 projected by the image projector 410 onto the array of conversion units 420. Projecting optics 440 is provided and optically coupled to the array of conversion units 420. The projecting optics 440 collects infrared radiation 430 radiated by the conversion units 420, and form an image onto the image sensor of an infrared camera under test.

Similarly to the embodiment shown in FIG. 7, the conversion chip 416 is used in a front lit configuration. As depicted in this embodiment, the airtight chamber 406 has a first transmission window 447 which is optically transparent to visible and near-infrared light and to infrared radiation so as to let the light beam 412 be received on the array of conversion units 420 after its reflection onto the dichroic optical element 459. In this embodiment, the dichroic optical element 459 is used to reflect the light beam 412, received from the focusing optics 426, towards the first transmission window 447. Similarly to the dichroic optical element 359 of FIG. 7, the dichroic optical element 459 is adapted to be optically reflective to visible and/or near-infrared light and optically transparent to infrared radiation so as to transmit at least a portion of the infrared radiation 430 emitted from the conversion units 420. As illustrated in this embodiment, the first transmission window 447 is parallel to the array of conversion units 420, and the dichroic optical element 459 forms an angle of 45° with both the first transmission window 447 and the array of conversion units 420. In alternate embodiments, a different angle can be used.

As will be understood, in the embodiments described with reference to FIGS. 7 and 8, the substrate 318 or 418 needs not be optically transparent to visible and near-infrared light.

Figure 9:
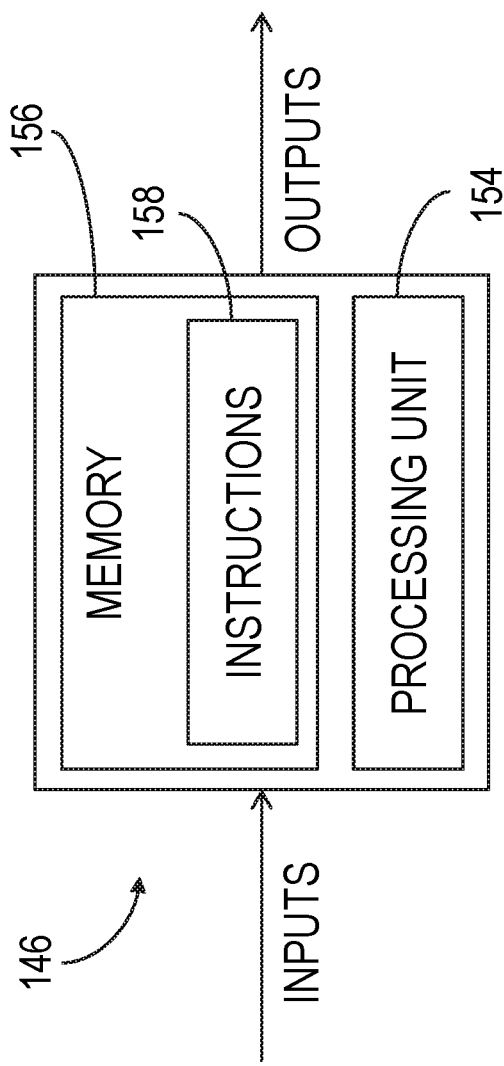
FIG. 9 is a schematic view of an implementation of a computer including a combination of software and hardware components, in accordance with an embodiment.

FIG. 9 shows a schematic representation of the computer 146 shown in FIG. 1, as a combination of software and hardware components. The computer 146 is generally operated to provide an image feed or signal such that the image projector can project a light beam in accordance with some image data. The image data can be representative of a still image or a video stream, depending on the embodiment. As shown, the computer 146 can have one or more processing units (collectively referred to as "the processing unit 154")

and one or more computer-readable memories (collectively referred to as "the memory 156").

In some embodiments, the image data are previously created, collected and selected, and then stored in an external memory (e.g., hard drive, solid state drive, USB key) accessible by the computer 146. In some other embodiments, the image data are stored on the memory 156. In alternate embodiments, the image data are stored on an external computer via a network.

The memory 156 can have program instructions 158 stored thereon and configured to cause the processing unit 154 to generate one or more outputs based on one or more inputs. The inputs may comprise one or more signals representative of the image data and the like. The outputs may comprise one or more signals representative of image signal provided to the image projector 110. The image signal can be transmitted using communication protocols such as USB, IEEE-488 (FireWre) RS-170, NTSC, VGA, DVI, HDMI or any other suitable communication protocol. Before being provided to the image projector 110, the image data can be exported into a desired file format such as JPG, TIFF, PNG, GIF, BMP, AVI, MPEG 4 AVC (H264), WMV, MOV and the like. The program instructions can include an image processing application which can process image data in accordance with non-uniformity correction (NUC) parameters.

The processing unit 154 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 156 may comprise any suitable known or other machine readable storage medium. The memory 156 may comprise non-transitory computer readable storage medium such as, for example, but not limited to, an electronic, magnetic, optical, electromagnetic, infrared, or semiconductor system, apparatus, or device, or any suitable combination of the foregoing. The memory 156 may include a suitable combination of any type of computer memory that is located either internally or externally to device such as, for example, random-access memory (RAM), read-only memory (ROM), compact disc read-only memory (CDROM), electro optical memory, magneto-optical memory, erasable programmable read-only memory (EPROM), and electrically-erasable programmable read-only memory (EEPROM), Ferroelectric RAM (FRAM) or the like. The memory 156 may comprise any storage means (e.g., devices) suitable for retrievably storing machine-readable instructions executable by the processing unit 154.

Each computer program described herein may be implemented in a high level procedural or object oriented programming or scripting language, or a combination thereof, to communicate with a computer. Alternatively, the programs may be implemented in assembly or machine language. The language may be a compiled or an interpreted language. Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

A method of manufacturing a conversion chip is provided. The method includes providing a substrate, depositing a sacrificial layer onto a face of the substrate, the sacrificial layer having a thickness based on a desired spacing between the substrate and the suspended platform of the conversion units, etching the supporting post shape(s) in the sacrificial layer until the substrate is reached, applying material (e.g., dielectric) having desired thermal, mechanical and optical properties directly onto the substrate inside the supporting post shape(s) and onto the sacrificial layer to form the optional support arms and the suspended platform, depositing the absorber layer or material to form FSS if desired, etching contours of the support arms and of the suspended platform, and removing the sacrificial layer.

Another method of manufacturing a conversion chip is provided. The method includes providing a substrate, depositing a sacrificial layer onto a face of the substrate, the sacrificial layer having a thickness based on a desired spacing between the substrate and the suspended platform of the conversion units, etching the supporting post shape(s) in the sacrificial layer until the substrate is reached, applying material (e.g., dielectric) having desired thermal, mechanical and optical properties directly onto the substrate inside the supporting post shape(s) and onto the sacrificial layer to form the optional support arms and the suspended platform, depositing material to form FSS if desired, etching contours of the support arms and of the suspended platform, removing the sacrificial layer, depositing the absorber layer, and trimming the absorber layer if necessary.

As can be understood, the examples described above and illustrated are intended to be exemplary only. The housing is optional. For instance, in the embodiments illustrated in the figures, a housing is used as a support structure to hold the image projector and the conversion chip (via the airtight chamber) in a fixed position relative to one another, defining a visible beam path leading from the image projector to the conversion chip, and an infrared beam path leading away from the conversion chip, outside the airtight chamber and outside the housing. In alternate embodiments, the airtight chamber itself can include a structural enclosure and one or more beam path windows optically communicating thereacross. The optical components of the image projector can be secured to one another via a frame, and the frame can be secured to the structural enclosure. In still alternate embodiments, a dedicated frame can be used as a support structure. The dedicated frame can directly receive, secured thereto, the components of the image projector and the airtight chamber. In still other embodiments, a supporting structure can be provided in the form of an optical table, an optical bench, threaded barrels, mounts, retaining rings, and any other suitable structure which can support components of the infrared scene projector and maintain them in a fixed position relative to one another. The support structure can be made of a plurality of structural elements made integral to one another by any suitable means, such as threads, welding, glue, etc. Alternately, the support structure may be monolithic. The scope is indicated by the appended claims.

What is claimed is:

1. An infrared scene projector comprising:
   a support structure having an airtight chamber;
   an image projector secured to the support structure;
   a conversion chip having a substrate secured to the support structure, and an array of conversion units received on a face of the substrate, the array of conversion units being enclosed in the airtight chamber and being optically coupled to the image projector, each one of the conversion units having at least one supporting post secured to the face of the substrate and a suspended platform held spaced apart from the face of the substrate by the at least one supporting post, the conversion chip being adapted to convert at least one of visible and near-infrared light received from the image projector into infrared radiation; and an infrared beam path extending away from the array of conversion units.

2. The infrared scene projector of claim 1 wherein the at least one supporting post of each of the conversion units is in direct contact with the face of the substrate.

3. The infrared scene projector of claim 1, further comprising projecting optics secured to the support structure and optically coupled to the array of conversion units and configured to project infrared radiation received from each one of the conversion units in the form of an infrared beam along the infrared beam path.

4. The infrared scene projector of claim 3 wherein the projecting optics includes a collimator and the infrared beam is collimated, the image projector and the conversion chip being optically coupled via focusing optics secured to the support structure and adapted to receive a light beam emitted from the image projector and to form an image brought into focus on the array of conversion units.

5. The infrared scene projector of claim 1 wherein the airtight chamber includes a pressure control mechanism, the pressure control mechanism being configured to vary a pressure inside the airtight chamber.

6. The infrared scene projector of claim 1 wherein the airtight chamber includes a permanent vacuum.

7. The infrared scene projector of claim 1 wherein the substrate is secured to the airtight chamber via at least one support, the at least one support including a heat transfer device.

8. The infrared scene projector of claim 1 wherein the suspended platform of each conversion unit is connected to the at least one supporting post via a support arm.

9. The infrared scene projector of claim 1 wherein the suspended platform of each conversion unit is connected to the substrate via at least one support arm extending between the suspended platform and the substrate, each of the at least one support arm having a first end adapted to receive a corresponding one of the at least one supporting post of the corresponding conversion unit and a second end having a second supporting post connecting the support arm to the substrate.

10. The infrared scene projector of claim 1 wherein the array of conversion units has a quantity of conversion units which is greater than a quantity of pixels of the image projector.

11. A conversion chip comprising:
a substrate; and
an array of conversion units received on a face of the substrate, each one of the conversion units having at least one supporting post secured directly to the face of the substrate and a suspended platform held spaced apart from the face of the substrate by the at least one supporting post, each conversion unit being adapted to convert at least one of visible and near-infrared light into infrared radiation.

12. The conversion chip of claim 11 further comprising an absorber layer covering the array of conversion units, the absorber layer being trimmed into a plurality of absorber layer portions, each of the absorber layer portions covering a corresponding one of the conversion units of the array.

13. The conversion chip of claim 11 further comprising a Frequency Selective Surface (FSS) layer covering the array of conversion units.

14. The conversion chip of claim 13 wherein the FSS layer is provided in the form of a plurality of FSS layer portions, each of the FSS layer portions covering a corresponding one of the conversion units of the array.

15. The conversion chip of claim 11 wherein the substrate is made of a material being optically transparent in at least one of the visible region and the near-infrared region of the electromagnetic spectrum.

16. The conversion chip of claim 11 wherein the substrate is made of a material being optically transparent in the infrared region of the electromagnetic spectrum.

17. The conversion chip of claim 11 wherein the suspended platform of each conversion unit is connected to the at least one supporting post via a support arm, each conversion unit consisting of a monolithic structure made up of a material and including the suspended platform, and the at least one supporting post and support arms.

18. The conversion chip of claim 11 wherein the suspended platform of each conversion unit is connected to the substrate via at least one support arm extending between the suspended platform and the substrate, each of the at least one support arm having a first end adapted to receive a corresponding one of the at least one supporting post of the conversion unit and a second end having a second supporting post connecting the support arm to the substrate.

* * * * *